United States Patent
Shi et al.

(10) Patent No.: US 10,640,133 B2
(45) Date of Patent: May 5, 2020

(54) CONNECTING ROD TYPE TWO-LEVEL LOCKING DEVICE, HOPPER CAR BOTTOM DOOR AND HOPPER CAR

(71) Applicant: CRRC Yangtze Corporation Limited, Wuhan (CN)

(72) Inventors: Chunjiang Shi, Wuhan (CN); Mingdao Sun, Wuhan (CN); Qiangjun Jiang, Wuhan (CN); Fengwei Liu, Wuhan (CN); Baolei Wang, Wuhan (CN); Wenliang Liu, Wuhan (CN); Chuqiang Tang, Wuhan (CN); Ruijin Jiang, Wuhan (CN); Liangcai Lin, Wuhan (CN); Tiejun Fu, Wuhan (CN)

(73) Assignee: CRRC Yangtze Corporation Limited, Wuhan, Hubei (CN)

( * ) Notice: Subject to any disclaimer, the term of this patent is extended or adjusted under 35 U.S.C. 154(b) by 195 days.

(21) Appl. No.: 15/817,093

(22) Filed: Nov. 17, 2017

(65) Prior Publication Data

US 2018/0072333 A1 Mar. 15, 2018

Related U.S. Application Data

(63) Continuation of application No. 14/758,737, filed as application No. PCT/CN2014/090411 on Nov. 6, 2014, now abandoned.

(30) Foreign Application Priority Data

Nov. 15, 2013 (CN) .............................. 2013 0 571352

(51) Int. Cl.
*B61D 7/16* (2006.01)
*B61D 7/26* (2006.01)
(Continued)

(52) U.S. Cl.
CPC ............... *B61D 7/16* (2013.01); *B61D 7/02* (2013.01); *B61D 7/26* (2013.01); *F16D 19/00* (2013.01)

(58) Field of Classification Search
CPC .... B61D 7/00; B61D 7/02; B61D 7/04; B61D 7/14; B61D 7/16; B61D 7/18
See application file for complete search history.

(56) References Cited

U.S. PATENT DOCUMENTS 3,625,159 A * 12/1971 Radey ...................... B61D 7/30
                                                            105/91
4,291,631 A    9/1981 Knippel
2015/0353102 A1  12/2015 Shi et al.

FOREIGN PATENT DOCUMENTS

AU    2014350782    7/2015
CN    101177142     5/2008
(Continued)

OTHER PUBLICATIONS

U.S. Patent and Trademark Office, Office action is U.S. Appl. No. 14/758,737, dated Aug. 18, 2017, 13 pages.
(Continued)

*Primary Examiner* — Robert J McCarry, Jr.
(74) *Attorney, Agent, or Firm* — Chernoff Villhauer LLP

(57) ABSTRACT

The present invention discloses a connecting rod type two-level locking device, a hopper car bottom door and a hopper car, and belongs to the technical field of rail wagons. The connecting rod type two-level locking device includes a transmission shaft, a door opening arm, a first roller, a second roller, a first locating pin, a standstill locking disk and a linkage mechanism. The hopper car bottom door includes the connecting rod type two-level locking device. The hopper car includes the bottom door. Even if the connecting rod type two-level locking device is accidentally stressed, the linkage mechanism cannot rotate, and at this (Continued)

time, the slave arm cannot rotate neither. The accidental opening of the hopper car bottom door can be avoided. The hopper car is more reliable to use.

8 Claims, 3 Drawing Sheets

(51) Int. Cl.
*B61D 7/02* (2006.01)
*F16D 19/00* (2006.01)

(56) References Cited

FOREIGN PATENT DOCUMENTS

| | | |
|---|---|---|
| CN | 202743242 | 2/2013 |
| CN | 103303323 | 9/2013 |
| CN | 103303324 | 9/2013 |
| CN | 103552565 | 2/2014 |
| CN | 203580952 | 5/2014 |

OTHER PUBLICATIONS

State Intellectual Property Office of the P. R. China, International Search Report for PCT/CN2014/090411, dated Feb. 4, 2015, 6 pages.

* cited by examiner

CONNECTING ROD TYPE TWO-LEVEL LOCKING DEVICE, HOPPER CAR BOTTOM DOOR AND HOPPER CAR

CROSS-REFERENCE TO RELATED APPLICATIONS

This application is a continuation of U.S. patent application Ser. No. 14/758,737 filed Jun. 30, 2015, which claims priority to PCT/CN2014/090411 filed Nov. 6, 2014, which claims priority to CN20130571352.8 filed Nov. 15, 2013. The complete disclosures of the above applications are hereby incorporated by reference for all purposes.

FIELD OF THE INVENTION

The present invention relates to the technical field of rail wagons, and particularly relates to a connecting rod type two-level locking device, a hopper car bottom door and a hopper car.

BACKGROUND OF THE INVENTION

Most existing railroad hopper cars adopt box type bottom door structures, and bottom doors are controlled by bottom door opening and closing mechanisms to open and close to achieve an automatic unloading function. Under this structure, the opening, closing and locking of the bottom doors completely depend on the control of the bottom door opening and closing mechanisms. In the case of failure of the bottom door opening and closing mechanisms, the bottom doors are out of effective control and are completely at a free rotation state, and the bottom doors are liable to automatically open due to vibration in a vehicle operation process, resulting in commodity leakage or automatic unloading to affect the traffic safety.

The bottom door opening and closing mechanisms are key components for ensuring the normal unloading of the railroad hopper cars and require convenient opening and closing operations and stable performance, and the existing mechanical impact self-unloading type bottom door opening and closing mechanisms have the above characteristics, thus being widely used on the railroad hopper cars at home and abroad at present. Moreover, corresponding self-locking devices are provided to prevent automatic opening of the bottom doors due to such reasons as vibration and the like or abnormal opening of the bottom doors caused by other factors in a transportation process.

However, the current two-level locking solutions of the hopper cars adopting the mechanical impact self-unloading type bottom door opening and closing mechanisms are based on the locking operation handle principle, which has relatively limited adaptability and cannot meet the requirements of bilaterally opening and closing the bottom doors.

SUMMARY OF THE INVENTION

To solve the above problems, the present invention provides a connecting rod type two-level locking device arranged on a hopper car bottom door, which is opened and closed by a planar four-bar linkage passing a dead point, a hopper car bottom door including the connecting rod type two-level locking device and a hopper car including the bottom door.

The connecting rod type two-level locking device provided by the present invention includes a transmission shaft, a door opening arm, a first roller, a second roller, a first locating pin, a standstill locking disk and a linkage mechanism, wherein the door opening arm includes a master arm and a slave arm, a slotted hole is formed on one end of the master arm, the other end of the master arm is fixedly connected to the transmission shaft, the first locating pin is fixedly connected to the first roller, the first roller forms a sliding pair with the slotted hole through the first locating pin, the second roller is hinged with one end of the slave arm, and the other end of the slave arm is fixedly connected to the transmission shaft;

the standstill locking disk is fixedly connected to the transmission shaft, and convex teeth are arranged at the bottom end of the standstill locking disk;

the linkage mechanism includes an unlocking lever, an unlocking connecting rod and a linkage locking pawl, the unlocking lever is provided with an end a and an end b, the unlocking connecting rod is provided with an end c and an end d, the linkage locking pawl is provided with an end m and an end n, the end b of the unlocking lever is hinged with the end c of the unlocking connecting rod, and the end d of the unlocking connecting rod is hinged with the end m of the linkage locking pawl;

the middle position of the unlocking lever is hinged with the master arm, the end a of the unlocking lever is lapped on the first roller, and the end n of the linkage locking pawl is hinged with the slave arm;

in general, the first locating pin is located at the lower semicircle of the slotted hole, at this time, the end m of the linkage locking pawl abuts against the convex teeth, and the connecting rod type two-level locking device is a truss;

when the first roller is applied with an upward acting force, the first roller is driven by the first locating pin to slide upwards in the slotted hole, when the first locating pin is located at the upper semicircle of the slotted hole, the end m of the linkage locking pawl deviates from the convex teeth, at this time, a force is continuously applied to the first roller, and the slave arm moves together with the master arm and the linkage mechanism.

Preferably, the connecting rod type two-level locking device further includes a torsion spring, wherein the torsion spring is sleeved on the hinge point of the end n of the linkage locking pawl and the slave arm in an intercrossing manner, one end of the torsion spring is fixedly connected to the slave arm, the other end of the torsion spring is fixedly connected to the linkage locking pawl, and the torsion spring can provide a standstill locking force to the linkage mechanism.

Preferably, a reserved amount is arranged between the end m of the linkage locking pawl and the convex teeth, and the range of the reserved amount is the maximum dead point passing position to the maximum dead point departing position of the door opening arm.

Preferably, the range of the reserved amount is the maximum dead point passing position to the minimum dead point passing position of the door opening arm.

The present invention further provides a hopper car bottom door, including the connecting rod type two-level locking device provided by the present invention.

The present invention further provides a hopper car, including the hopper car bottom door provided by the present invention.

According to the connecting rod type two-level locking device provided by the present invention, the standstill locking disk and the linkage mechanism are additionally arranged on the basis of the hopper car bottom door, which is opened and closed by the planar four-bar linkage passing the dead point, in general, since the end m of the linkage locking pawl abuts against the convex teeth of the standstill locking disk due to the self-gravity of the first roller and the unlocking lever, the connecting rod type two-level locking device is the truss, even if the first roller is accidently applied with an upward acting force, as long as the first locating pin does not arrive at the upper semicircle of the slotted hole formed on the mater arm and is continuously stressed, the linkage mechanism cannot rotate, and at this time, the slave arm cannot rotate neither.

The hopper car bottom door provided by the present invention includes the connecting rod type two-level locking device provided by the present invention, even if the first roller is accidently applied with an upward acting force, as long as the first locating pin does not arrive at the upper semicircle of the slotted hole formed on the mater arm, the linkage mechanism cannot rotate, at this time, the slave arm cannot rotate neither, so that the accidental opening of the hopper car bottom door is avoided.

The hopper car provided by the present invention has the hopper car bottom door provided by the present invention, and the accidental opening of the hopper car bottom door can be avoided, so that the application is more reliable.

DETAILED DESCRIPTION OF THE EMBODIMENTS

Figure 1:
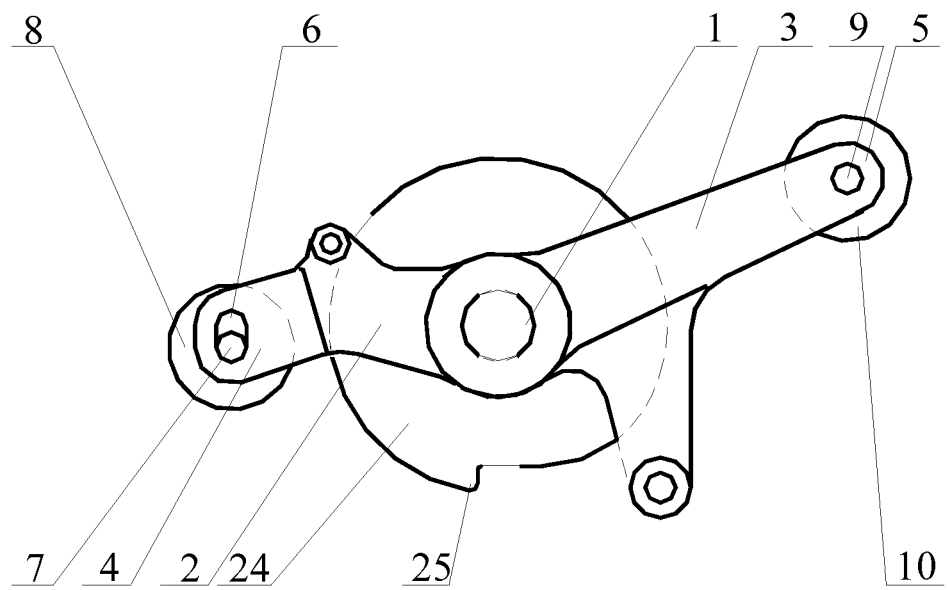
FIG. 1 is a schematic diagram of a structure of a connecting rod type two-level locking device (with linkage mechanism removed) provided by an embodiment of the present invention.

To better understand the present invention, a detailed illustration of the present invention will be given below in combination with accompanying drawings and specific embodiments.

See FIG. 1 to FIG. 4, a connecting rod type two-level locking device provided by the present invention includes a transmission shaft 1, a door opening arm, a first roller 8, a second roller 10, a first locating pin 7, a standstill locking disk 24 and a linkage mechanism, wherein the door opening arm includes a master arm 2 and a slave arm 3, a slotted hole 6 is formed on one end 4 of the master arm 2, the other end of the master arm is fixedly connected to the transmission shaft 1, the first locating pin 7 is fixedly connected to the first roller 8, the first roller 8 forms a sliding pair with the slotted hole 6 through the first locating pin 7, the second roller 10 is hinged with one end 5 of the slave arm 3, the reference number of the hinge point is 9, and the other end of the slave arm is fixedly connected to the transmission shaft 1.

The standstill locking disk 24 is fixedly connected to the transmission shaft 1, and convex teeth 25 are arranged at the bottom end of the standstill locking disk 24.

The linkage mechanism includes an unlocking lever 11, an unlocking connecting rod 15 and a linkage locking pawl 20, the unlocking lever 11 is provided with an end a 12 and an end b 13, the unlocking connecting rod 15 is provided with an end c 16 and an end d 17, the linkage locking pawl 20 is provided with an end m 21 and an end n 22, the end b 13 of the unlocking lever 11 is hinged with the end c 16 of the unlocking connecting rod 15, the reference number of the hinge point is 18, the end d 17 of the unlocking connecting rod 15 is hinged with the end m 21 of the linkage locking pawl 20, and the reference number of the hinge point is 19.

The middle position of the unlocking lever 11 is hinged with the master arm 2, the reference number of the hinge point is 14, the end a 12 of the unlocking lever 11 is lapped on the first roller 8, and the end n of the linkage locking pawl 20 is hinged with the slave arm 3.

Figure 2:
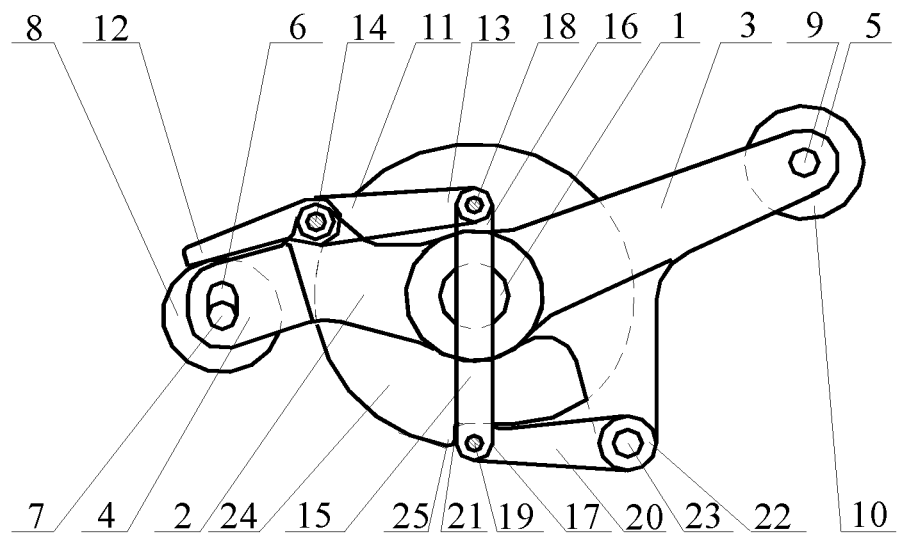
FIG. 2 is a schematic diagram of a structure of a connecting rod type two-level locking device provided by an embodiment of the present invention, when the end m of a linkage locking pawl abuts against the convex teeth of a standstill locking disk.

See FIG. 2, in general, the first locating pin 7 is located at the lower semicircle of the slotted hole 6, at this time, the end m 21 of the linkage locking pawl 20 abuts against the convex teeth 25, and the connecting rod type two-level locking device is a truss.

Figure 3:
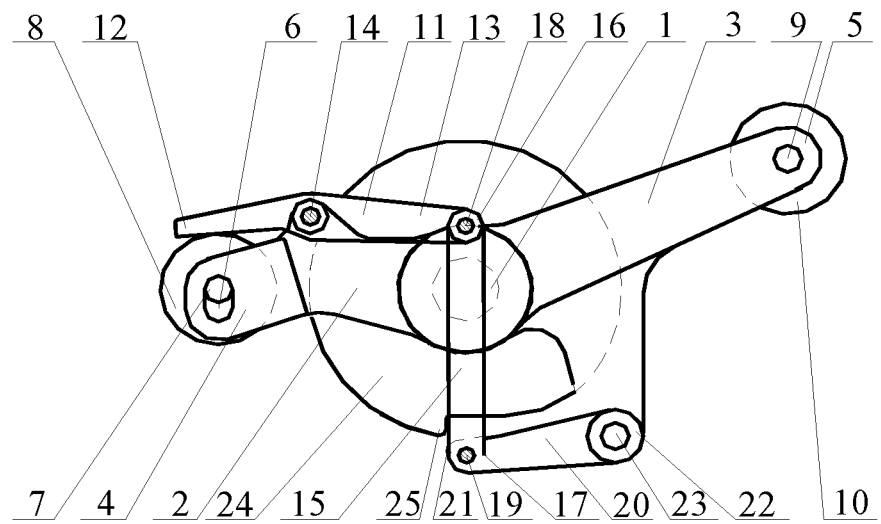
FIG. 3 is a schematic diagram of a structure of a connecting rod type two-level locking device provided by an embodiment of the present invention, when the end m of a linkage locking pawl just deviates from the convex teeth of a standstill locking disk.
Figure 4:
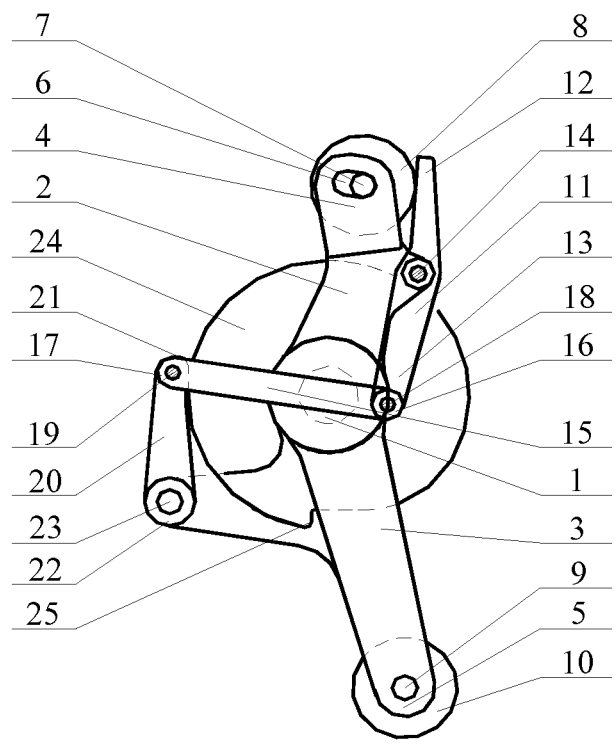
FIG. 4 is a schematic diagram of a structure of a connecting rod type two-level locking device provided by an embodiment of the present invention, when a slave arm moves to the limit.

See FIG. 3, when the first roller 8 is applied with an upward acting force, the first roller 8 is driven by the first locating pin 7 to slide upwards in the slotted hole 6, when the first locating pin 7 is located at the upper semicircle of the slotted hole 6, the end m 21 of the linkage locking pawl 20 deviates from the convex teeth 25, at this time, a force is continuously applied to the first roller 8, and the slave arm 3 moves together with the master arm 2 and the linkage mechanism, until moving to the position as shown in FIG. 4.

According to the connecting rod type two-level locking device provided by the present invention, the standstill locking disk 24 and the linkage mechanism are additionally arranged on the basis of the hopper car bottom door, which is opened and closed by the planar four-bar linkage passing the dead point, in general, since the end m 21 of the linkage locking pawl 20 abuts against the convex teeth 25 of the standstill locking disk 24 due to the self-gravity of the first roller 8 and the unlocking lever 11, the connecting rod type two-level locking device is the truss, even if the first roller 8 is accidently applied with an upward acting force, as long as the first locating pin 7 does not arrive at the upper semicircle of the slotted hole 6 formed on the mater arm 2 and is continuously stressed, the linkage mechanism cannot rotate, and at this time, the slave arm 3 cannot rotate neither.

Wherein, the transmission shaft 1 is provided with an eccentricity passing distance, the larger the eccentricity passing distance is, the larger the pressing force of the end m of the linkage locking pawl 20 and the convex teeth 25 of the standstill locking disk 24 is, the larger the acting force needing to be applied to the first roller 1 is, and the better the reliability of the connecting rod type two-level locking device provided by the present invention can be guaranteed.

Figure 6:
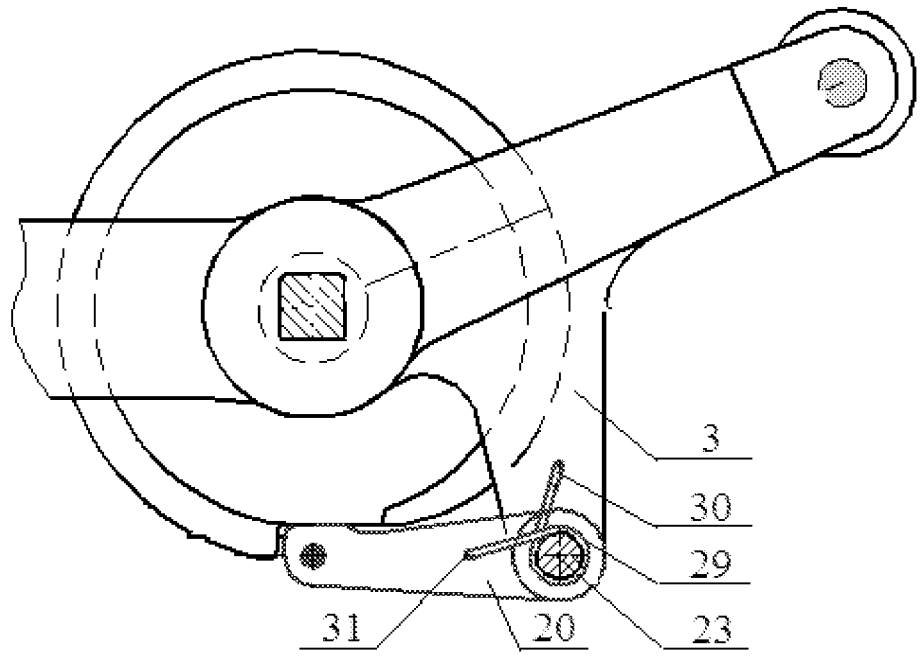
FIG. 6 is a schematic diagram of a structure of a torsion spring and a connection of the torsion spring with a slave arm and a linkage locking pawl of a connecting rod type two-level locking device provided by an embodiment of the present invention.

Wherein, see FIG. 6, the connecting rod type two-level locking device can further include a torsion spring 29, the torsion spring 29 is sleeved on the hinge point 23 of the end n 22 of the linkage locking pawl 20 and the slave arm 3 in an intercrossing manner, one end 30 of the torsion spring 29 is fixedly connected to the slave arm 3, the other end 31 of the torsion spring is fixedly connected to the linkage locking pawl 20, the torsion spring 29 can provide a standstill locking force to the linkage mechanism, and the standstill locking force is used for preventing the linkage mechanism from rotating together with the self-gravity of the first roller 8 and the unlocking lever 11, so that the connecting rod type two-level locking device provided by the present invention is more reliable.

Figure 5:
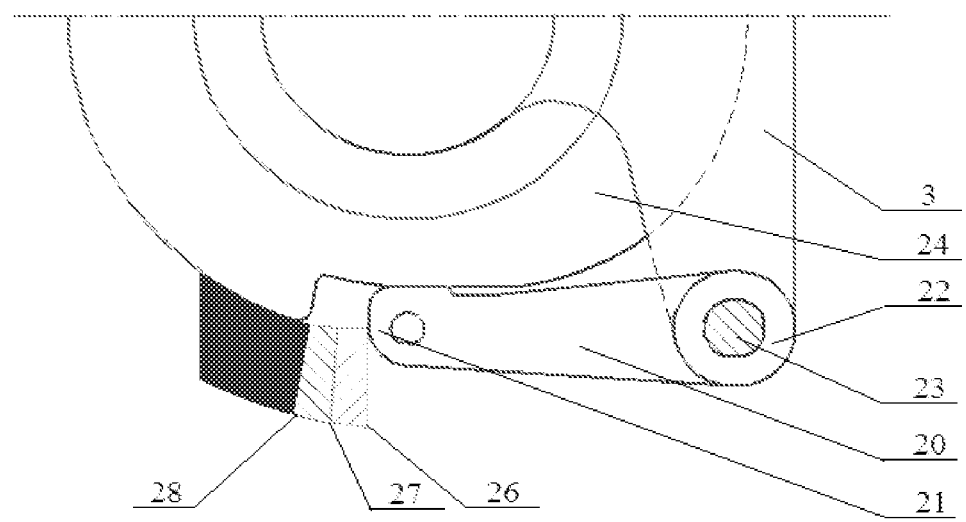
FIG. 5 is a schematic diagram of a structure of a reserved amount between the end m of a linkage locking pawl and convex teeth of a connecting rod type two-level locking device provided by an embodiment of the present invention.

Wherein, see FIG. 5, a reserved amount is arranged between the end m of the linkage locking pawl 20 and the convex teeth 25, the range of the reserved amount is the maximum dead point passing position 26 to the maximum dead point departing position 28 of the door opening arm, at this time, the connecting rod type two-level locking device can not only be locked in two levels, but also can be applied to new manufacture and overhaul, the reliability and adaptability of the connecting rod type two-level locking device are improved, and the connecting rod type two-level locking device is convenient to overhaul and maintain.

Wherein, considering that the position passing the dead point of the used transmission shaft 1 in an opening and closing process is decreased as compared with that in new manufacture, a reserved amount away from the dead point of the transmission shaft is considered in the locking position of the linkage locking pawl 20, and the range of the reserved amount is the maximum dead point passing position 26 to the minimum dead point passing position 27 of the door opening arm.

The present invention further provides a hopper car bottom door, including the connecting rod type two-level locking device provided by the present invention.

The present invention further provides a hopper car, including the hopper car bottom door provided by the present invention.

The hopper car bottom door provided by the present invention includes the connecting rod type two-level locking device provided by the present invention, even if the first roller is accidentally applied with an upward acting force, as long as the first locating pin does not arrive at the upper semicircle of the slotted hole formed on the mater arm, the linkage mechanism cannot rotate, at this time, the slave arm cannot rotate neither, so that the accidental opening of the hopper car bottom door is avoided.

The hopper car provided by the present invention has the hopper car bottom door provided by the present invention, and the accidental opening of the hopper car bottom door can be avoided, so that the application is more reliable.

The foregoing specific implementations are further detailed descriptions of the purposes, technical solutions and beneficial effects of the present invention, and it should be understood that, the foregoing descriptions are merely specific implementations of the present invention, rather than limiting the present invention. Any modifications, equivalent substitutions and improvements or the like made within the spirit and principle of the present invention shall fall within the protection scope of the present invention.

We claim:

1. A two-level locking device, comprising a transmission shaft, a door opening arm, a first roller, a second roller, a first locating pin, a standstill locking disk and a linkage mechanism, wherein the door opening arm comprises a master arm and a slave arm, a slotted hole is formed on one end of the master arm, the other end of the master arm is fixedly connected to the transmission shaft, the first locating pin is fixedly connected to the first roller, the first roller forms a sliding pair with the slotted hole through the first locating pin, the second roller is hinged with one end of the slave arm, and the other end of the slave arm is fixedly connected to the transmission shaft;
the standstill locking disk is fixedly connected to the transmission shaft, and convex teeth are arranged at the bottom end of the standstill locking disk;
the linkage mechanism comprises an unlocking lever, an unlocking connecting rod and a linkage locking pawl, the unlocking lever having longitudinally opposed first and second ends, the unlocking connecting rod having longitudinally opposed third and fourth ends, the linkage locking pawl having longitudinally opposed fifth and sixth ends, the second end of the unlocking lever is hinged with the third end of the unlocking connecting rod, and the fourth end of the unlocking connecting rod is hinged with the fifth end of the linkage locking pawl;
the middle position of the unlocking lever is hinged with the master arm, the first end of the unlocking lever is lapped on the first roller, and the sixth end of the linkage locking pawl is hinged with the slave arm;
the first locating pin is located at the lower semicircle of the slotted hole, at this time, the fifth end of the linkage locking pawl abuts against the convex teeth, and the two-level locking device is a truss;
when the first roller is applied with an upward acting force, the first roller is driven by the first locating pin to slide upwards in the slotted hole, when the first locating pin is located at the upper semicircle of the slotted hole, the fifth end of the linkage locking pawl deviates from the convex teeth, at this time, a force is continuously applied to the first roller, and the slave arm moves together with the master arm and the linkage mechanism.

2. The two-level locking device of claim 1, further comprising a torsion spring, wherein the torsion spring is sleeved on the hinge point of the sixth end of the linkage locking pawl and the slave arm in an intercrossing manner, one end of the torsion spring is fixedly connected to the slave arm, the other end of the torsion spring is fixedly connected to the linkage locking pawl, and the torsion spring can provide a standstill locking force to the linkage mechanism.

3. A hopper car bottom door, comprising the two-level locking device of claim 2.

4. A hopper car, comprising the hopper car bottom door of claim 3.

5. A hopper car bottom door, comprising the two-level locking device of claim 1.

6. The two-level locking device of claim 1, wherein the linkage locking pawl is sized such that a gap exists between the fifth end of the linkage locking pawl and the convex teeth, and the size of the gap between the fifth end and the convex teeth decreases as the fifth end moves from its maximum dead point passing position to its maximum dead point departing position.

7. The two-level locking device of claim 6, wherein the size of the gap between the fifth end and the convex teeth decreases as the fifth end moves from its maximum dead point passing position to its minimum dead point passing position.

8. A hopper car, comprising the hopper car bottom door of claim 5.

* * * * *